United States Patent [11] 3,561,656

[72] Inventor Friedrich R. Hertrich
Boulder, Colo.
[21] Appl. No. 814,689
[22] Filed Apr. 9, 1969
[45] Patented Feb. 9, 1971
[73] Assignee International Business Machines Corporation
Armonk, N.Y.
a corporation of New York

[54] SINGLE CAPSTAN MAGNETIC TAPE DRIVE SYSTEM WITHOUT TAPE STICK
4 Claims, 1 Drawing Fig.

[52] U.S. Cl. .......... 226/49
[51] Int. Cl. .......... B65h 77/00
[50] Field of Search .......... 226/43, 49, 50, 51; 340/124.1

[56] References Cited
UNITED STATES PATENTS
3,274,574 9/1966 Miller et al. .......... 340/174.1
3,318,545 5/1967 Tobey .......... 226/49UX

*Primary Examiner*—Richard A. Schacher
*Assistant Examiner*—Gene A. Church
*Attorneys*—Hanifin and Jancin and Herbert F. Somermeyer

ABSTRACT: A single capstan magnetic tape system having a processing station disposed intermediate a single drive capstan, and one of two vacuum columns exhibiting high opposing drag when the capstan attempts to drive the tape through the processing station toward the one vacuum column. The possibility of tape stick caused by this high drag is prevented by the tape control unit sensing that the tape has been stopped a predetermined time; then a "forward hitch" is instituted wherein the tape is first transported in opposite direction from the area of high drag for a predetermined time or distance; and then, the tape movement is immediately reversed moving the tape through the processing station toward the one vacuum column.

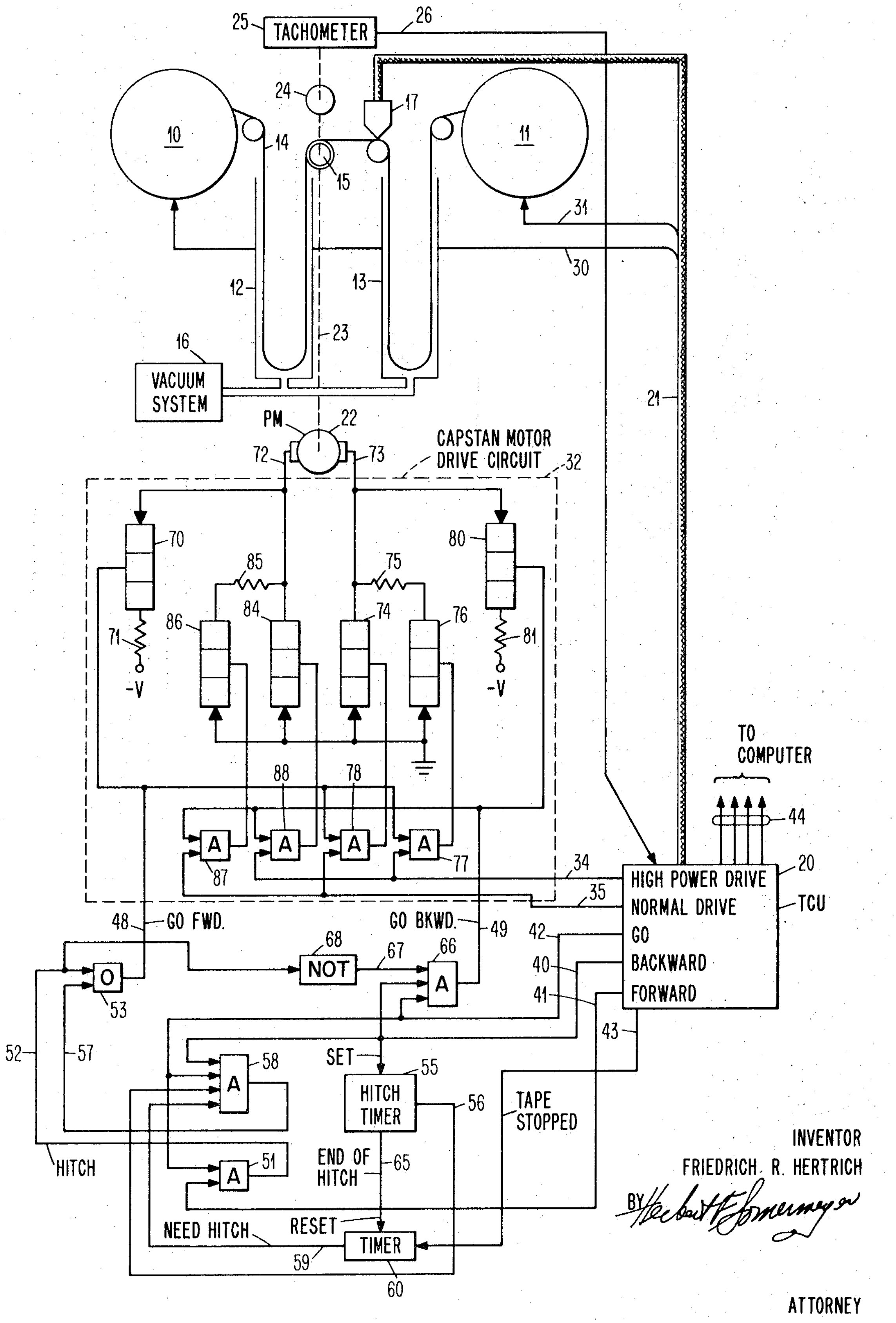
INVENTOR
FRIEDRICH R. HERTRICH
BY Herbert F. Somermeyer
ATTORNEY

SINGLE CAPSTAN MAGNETIC TAPE DRIVE SYSTEM WITHOUT TAPE STICK

BACKGROUND OF THE INVENTION

The present invention relates to magnetic tape transport systems and, more particularly, to those magnetic tape transport systems utilizing a single capstan drive.

Single capstan tape transport units are finding favor in the data processing industry for the transport of magnetic tapes having recorded digital data thereon. In some instances, the path the tape follows across the single capstan can be made as a low frictional path such that drive in either direction is substantially the same. However, in some instances, it is desired or necessary that, to process digital data signals to or from the magnetic recording tape, a substantial contact be made with the tape. Such contact introduces frictional drag which can and has caused transporting problems (i.e., the tape does not always move when the tape driving capstan is rotated).

Such single capstan tape drives are usually characterized by supply and takeup spools or reels having a pair of vacuum column disposed therebetween for forming small low inertia tape storage loops therein. The single drive capstan and the processing station are disposed between the pair of vacuum columns. The processing station, which causes the drag, is disposed between one of the vacuum columns and the drive capstan. Whenever the drive capstan is to transport tape toward a second one of the columns, there are no tape stick problems because the capstan is moving the tape into the vacuum column with no intervening drag. On the other hand, when the tape is moved toward the one vacuum column (i.e., sometimes referred to as in the backward direction), then the capstan must first move the tape through the processing station which exhibits drag and thence into the one vacuum column. Even though the one vacuum column exerts a certain pulling force on the tape, it has been found to be insufficient to assist the capstan in moving the tape in the so-called backward direction. This problem is acute only when tape has been stopped (i.e., when tape is to be started moving in the backward direction). Immediate reversals of the tape have not been found to cause the above-described tape stick problem.

SUMMARY OF THE INVENTION

It is an object of the present invention to provide a single capstan magnetic tape drive having a processing station exhibiting a given drag substantially without tape sticking problems.

A single capstan digital data tape transporting system using the present invention has a signal processing station adjacent to the single capstan exhibiting a given drag. Bracketing the single capstan processing stations are a pair of vacuum columns or other forms of low inertia tape storage means which receive or supply, respectively, tape to and from the processing station and the single capstan drive. Transportation of the tape from the single capstan directly to a vacuum column is defined as transporting the tape in the first direction. In the opposite or second direction, the tape passes through the processing station toward the one vacuum column. When a command from a tape control unit is supplied to move the tape from a stopped condition in the second direction a "forward hitch" is performed which includes moving the tape in the first direction a given period of time or distance and then, without stopping, immediately reversing the tape direction for transporting it in the second direction.

The foregoing and other objects, features and advantages of the invention will be apparent from the following more particular description of a preferred embodiment of the invention, as illustrated in the accompanying drawing.

BRIEF DESCRIPTION OF THE DRAWING

The FIGURE is a simplified, combined diagrammatic, block and signal flow diagram of a magnetic tape system utilizing the teaching of the present invention.

DETAILED DESCRIPTION OF THE PREFERRED EMBODIMENT

A single capstan drive magnetic tape transporting system is diagrammatically shown as having a pair of supply/takeup spools 10 and 11. A pair of vacuum columns 12 and 13 have formed therein loops of the tape 14 for providing low inertia supply of tape to the single drive capstan 15 permitting the inertia of spools 10 and 11 to be quite large. A vacuum system 16 supplies a constant vacuum to the bottom of the vacuum columns 12 and 13 in a known manner. Intermediate the one vacuum column 13 and single drive capstan 15 is signal processing station 16 which exhibits drag on the tape 14 as it is transported therethrough by driving capstan 15. When the tape is transported in a first direction (i.e., from driving capstan 15 into vacuum column 12), the drag on tape 14 by processing station 17 does not interfere with the acceleration of the tape. The reason for this is that the tape is being driven from an area of high drag to an area of a slight attraction (i.e., the vacuum from system 16). However, when the tape is transported in the second direction (i.e., from driving capstan 15 first through processing station 17 and thence into one vacuum column 13), the drag exhibited by processing station 17 must be first overcome before the tape can move. It has been found through experience that, when the processing station 17 exerts a given drag, the single capstan is often ineffective to cause tape 14 to move in the second direction. Such malfunctioning is not acceptable for so-called high performance magnetic tape systems.

Operation of the tape transporting system is under control of tape control unit (TCU) 20, which includes circuits of known design necessary to provide the controlling signals as hereinafter described for the operation of a tape transporting system. Cable 21 is connected to signal processing station 17 for exchanging electrical signals between TCU 20 and signal processing station 17 necessary for the recording and recovery of signals onto and from tape 14. Capstan drive motor 22 is directly coupled to driving capstan 15 as indicated by dotted line 23 and has a tachometer disc 24 for indicating the speed of the capstan and hence the speed of the tape 14. A tachometer system 25 is operatively associated with tachometer disc 24 to generate a series of pulses indicative of the speed of the capstan 15 and supplied over line 26 to tape control unit 20. TCU 20 is responsive to such pulses to regulate the speed of the motor as will be later referred to. Additionally, TCU 20 supplies control signals over lines 30 and 31, respectively, to motors (not shown) for driving spools 10 and 11 in a proper direction and velocity in accordance with known principles. For example, the lengths of the loops of tape 14 in respective vacuum columns 12 and 13 are quite often used to control the reeling and unreeling of tape to and from spools 10 and 11.

The capstan drive motor 22 is under direct control of the capstan motor drive circuit 32 (shown in simplified form). Circuit 32 is in turn controlled by signals in the form of variable frequency pulses supplied over lines 34 and 35 from TCU 20, respectively, to cause motor 22 to be in a high power drive or normal power drive in accordance with whether or not the motor is being accelerated or decelerated or merely transporting the tape at a constant velocity through processing station 17. The frequency of the pulses determines the speed of motor 22 and hence of tape 14.

The circuitry shown immediately to the left of TCU 20 in the FIGURE is directly associated with the forward hitch operation necessary for overcoming the tape stick problem in the illustrated single capstan tape transport. In a practical embodiment such later described circuits would be packaged with known circuits forming a part of TCU 20. Such circuitry is responsive to a "backward" signal (i.e., the tape is to be transported backward or in the second direction), supplied over line 40 from TCU 20. A "forward" signal supplied over line 41 enables the capstan motor drive circuit 32 to immediately transport tape 14 in the first or forward direction. In addition, TCU 20 supplies a GO signal over line 42 indicating that the tape transport may start moving the tape. A TAPE STOPPED signal is supplied over line 43 indicating that the tape is not moving. Other connections to TCU 20 are indicated by the plurality of arrows 44, including the usual connections to a computer, communication system, or other utilization means commonly used and widely known in the data processing industry.

The direction of motor 22 rotation is determined by the direction of current provided therethrough by capstan motor drive circuit 32. The direction of motor current is determined by the signals on lines 48 and 49 supplied by the now-described circuitry. The GO FORWARD or first direction signal on line 48 is supplied in response to the forward signal supplied over line 41. AND circuit 51 is jointly responsive to the forward signal on line 41 and to the GO signal on line 42, both from TCU 20 to supply an actuating signal over line 52 through OR circuit 53 to constitute the GO FORWARD signal on line 48.

A GO FORWARD signal is supplied as a part of the forward hitch operation of this invention when the backward signal on line 40 is first supplied by TCU 20 and tape 14 is stopped. The BACKWARD signal first sets hitch timer 55, a time-out timer, which determines the extent of forward movement of tape 14 in a forward hitch operation. As an example, hitch timer 55 may be a monostable multivibrator often referred to as a one-shot or single-shot. Alternatively, it may be a counter actuated by a clock (not shown) situated in most tape control units. In any event, upon being set, hitch timer 55 supplies an actuating signal over line 56 indicating that a hitch can be performed.

A hitch actuating signal on line 57 is supplied by AND circuit 58 in joint response to the backward signal on line 40, the GO signal on 42, the signal on line 56, and the "need hitch" signal on line 59. The "need hitch" signal enables AND circuit 58 to supply the hitch actuating signal on line 57 only after the tape 14 has been stopped a predetermined time, for example, 10milliseconds. The hitch actuating signal on line 57 is supplied through OR circuit 53 to then form the GO FORWARD signal 48, causing the tape 14 to be transported by capstan 15 into vacuum column 12 (i.e., in the first direction). Tape-stopped timer 60 is responsive to the tape-stopped signal on line 43 to initiate a time-out cycle of, for example, 10milliseconds, after which the "need hitch" signal is supplied over line 59. If the time-out timer 60 has not timed out, AND circuit 58 will not supply the hitch actuating signal on line 57, permitting the tape to immediately move in the second direction.

Tape-stopped timer 60 is used to define when tape 14 has stopped a sufficient time to probably cause a tape stick problem in second direction (backward) tape movement. Such time varies from unit to unit. In a high performance tape unit, it is desired to minimize read/record times. Since each forward hitch operation adds to a backward read or record time, it is desired to minimize the number of forward hitches required. Such criterion indicates the forward hitch should be initiated only when a maximumly tolerable tape stopped condition exists, such is usually a matter of empirical determination for each single capstan transport design.

Hitch time 55 is operative to determine the duration of the forward transport of tape 14 during a forward hitch operation. Hitch timer 55, a stated above, may measure elapsed time before terminating movement of tape 14 in the first direction. Alternatively, the tachometer signal supplied over line 26 may be used to actuate a counter to count the distance the tape 14 has traveled in the first direction before the hitch is terminated for causing tape movement in the second or backward direction. For example, when using one-half inch tape, the duration of the forward movement may be about 0.076 inch before such tape is transported in the backward direction. An exemplary duration of time for forward transport is about one millisecond. In any event, the expiration of the forward movement is determined by hitch timer 55 which then supplies an "end of hitch" signal over line 65 to resetting timer 60. Upon being reset, timer 60 removes the "need hitch" signal from line 59 causing AND circuit 58 to remove the hitch actuating signal on line 57; which then, of course, removes the "go forward" signal on line 48. Of course, when the forward hitch is initiated, the tape-stopped signal is removed preventing further timing action of timer 60. This action prevents a spurious forward hitch from being performed when not required.

Tape is then transported in the second or backward direction under the control of AND circuit 66, which supplies a "go backward" or second direction signal over line 49. AND circuit 66 is jointly responsive to the backward signal on line 40, to the GO signal on line 42, and to a control signal on line 67, indicating there is no hitch signal on line 57, to supply the "go backward " line 49 signal.

The "go backward" signal on line 49 is inhibited during the forward motion of tape 14 during the first portion of the hitch by the hitch actuating signal on line 57 being supplied to NOT circuit 68 which then in turn supplies a disabling signal over line 67 to block any signals from passing through AND circuit 66. Upon removal of hitch signal on line 57 by AND circuit 58, NOT circuit 68 then supplies an enabling signal over line 67 to thereby permit AND circuit 66 to supply the "go backward" signal. This action completes the forward hitch operation.

Capstan motor drive circuit 32 is essentially a current reversing switch capable of supplying high power and low power to permanent magnet capstan drive motor 22. The forward or first direction drive circuit includes transistor 70 connected through a collector resistor 71 to a −V supply. Its emitter electrode is connected to one side of the armature of permanent magnet 22 over line 72. The ground side of the armature circuit is completed by line 73 connected to the collector of transistor 74 or through resistor 75 to the collector of transistor 76. The emitters of the two transistors 74 and 76 are connected to ground reference potential. Transistor 70 and one of the two transistors 74 and 76 are simultaneously enabled for current conduction through motor 22 armature in a first direction by the GO FORWARD signal on line 48. A pair of AND circuits 77 and 78, respectively, select normal power drive or high power drive in response to the signals on lines 34 and 35. AND circuit 78 is jointly responsive to the GO FORWARD signal on line 48 and to the high power drive signal on line 35 to supply a transistor actuating signal to the base electrode of transistor 74. This actuating signal completes the current path from the −V1 supply through transistor 70 thence the armature of motor 22, line 73, and then transistor 74 to ground reference potential. Current amplitude is determined by the impedance of the motor 22 for normal drive operation, AND circuit 77 is jointly responsive to the go forward signal on line 48 and to the normal power drive signal on line 34 to make transistor 76 current conductive. Transistor 76 becoming current conductive enables a higher impedance current path from −V1 supply through transistor 70 thence the armature of motor 22 and through resistor 75 and transistor 76 to ground reference potential. The ratio of the power supply to the armature of permanent magnet motor 22 is determined by the value of the resistor 75. This arrangement completes the forward drive circuitry for permanent magnet motor 22.

The backward or second direction drive circuitry is identical to the forward drive circuitry in that transistor 80 is connected through a collector resistor to −V supply. The values of the collector resistors 71 and 81 can be identical. Also, the collectors of transistors 70 and 80 may be commoned together and connected through a single resistor to the −V supply. The emitter electrode of transistor 80 is connected over line 73 to the armature of motor 22. Thus, it is seen that the forward drive circuit transistor 70 is connected to one side of the armature while the backward drive transistor 80 is connected to the opposite side. The ground side of the backward drive armature circuit is connected from line 72 to the transistors 84 and 86. Resistor 85 is interposed between line 72 and the collector electrode of transistor 86. The impedance values of resistors 75 and 85 should be identical. A pair of AND circuits 87 and 88 control the conductivities of transistors 84 and 86 in the same manner as AND circuits 77 and 78 control the conductivities of transistors 74 and 76. It is understood that the capstan motor drive circuit 32 is shown in just one example of many capstan drive motor circuits that may be utilized in the practice of the present invention.

While the invention has been particularly shown and described with reference to a preferred embodiment thereof, it will be understood by those skilled in the art that various changes in form and details may be made therein without departing from the spirit and scope of the invention.

I claim:

1. A single drive capstan tape transporting system for transporting tape having recorded data signals thereon, a tape transport having a pair of tape storage means with a single drive capstan and a signal processing station interposed therebetween, a pair of low inertia tape storage loop means respectively interposed between said storage means and said capstan and processing station, said processing station being in a substantial contact relation with said tape and exerting a given drag thereon, a tape control unit operatively associated with said storage means and said capstan for causing operation thereof and for supplying a plurality of control and indicating signals, a capstan motor drive circuit controlling the current direction and amplitude in a motor for driving said capstan and being responsive to a first direction and second direction control signal for reversing the direction of current in said capstan drive motor, the improvement including the combination:

first control means including tape-stopped timing means responsive to said tape control unit indicating said tape being stopped to supply a need hitch signal;

second control means jointly responsive to said tape control unit indicating desired transport of tape in a second direction and to said need hitch signal to supply a hitch actuating signal causing said capstan motor drive circuit to move said tape in said first direction and operative after a predetermined tape movement to remove said hitch actuating signal; and third means jointly responsive to said tape control unit indicating desired transport of said tape in said second direction and to the absence of said hitch actuating signal to cause said capstan motor drive circuit to rotate said capstan in a direction for moving said tape in said second direction.

2. The system of claim 1, wherein said tape-stopped timing means supplies said need hitch signal only after said tape being stopped a predetermined time.

3. The system of claim 2, wherein said second control means, upon completion of said predetermined tape movement in said first direction, supplies a reset signal to said first control means to reset said tape-stopped timing means to remove said need hitch signal, and said second control means being responsive to said removal of said need hitch signal to remove said hitch actuating signal thereby enabling said third means.

4. A single capstan tape transporting system having a tape transporting path of high and low tape drag with a driving capstan disposed therebetween, tape transport in a first direction being from said capstan toward said low tape drag and in a second direction from said capstan toward said high tape drag, and capable of being in a stopped condition, the improvement including the combination:

first control means jointly responsive to said tape being in a stopped condition and initiating a desired tape transport in said second direction to initiate tape transport in said first direction;

second control means jointly responsive to said first control means initiating a desired tape transport in said second direction and a simultaneous predetermined tape movement in said first direction to supply an end of hitch signal; and said first control means being responsive to said end of hitch signal to immediately reverse direction of tape movement from said first to said second direction.